United States Patent
Back

(10) Patent No.: US 6,864,470 B2
(45) Date of Patent: Mar. 8, 2005

(54) MICROWAVE OVEN WITH BREAD TOASTER

(75) Inventor: Yoon Gun Back, Changwon-shi (KR)

(73) Assignee: LG Electronics Inc., Seoul (KR)

(*) Notice: Subject to any disclaimer, the term of this patent is extended or adjusted under 35 U.S.C. 154(b) by 115 days.

(21) Appl. No.: 10/293,515

(22) Filed: Nov. 14, 2002

(65) Prior Publication Data

US 2003/0132226 A1 Jul. 17, 2003

(30) Foreign Application Priority Data

Jan. 14, 2002 (KR) .......................................... 2002-2130

(51) Int. Cl.[7] .............................. H05B 6/80; A47J 37/00
(52) U.S. Cl. ....................... 219/685; 219/680; 219/756; 219/762; 219/521; 99/392; 99/DIG. 14
(58) Field of Search ................................. 219/685, 680, 219/725, 739, 756, 762, 763, 386, 521; 99/385, 391, 392, 393, 399, 400, 402, 451, DIG. 14

(56) References Cited

U.S. PATENT DOCUMENTS 6,539,840 B2 * 4/2003 Choi et al. ..................... 99/331

2002/0070212 A1 * 6/2002 Choi et al. ................... 219/680

FOREIGN PATENT DOCUMENTS

| EP | 1213948 | 6/2002 | |
| JP | 2004131 | 1/1990 | |
| JP | 3271630 | 12/1991 | |
| JP | 3-271630 | * 12/1991 | ................. 219/685 |
| JP | 5288351 | 11/1993 | |

* cited by examiner

Primary Examiner—Philip H. Leung
(74) Attorney, Agent, or Firm—McKenna Long & Aldridge LLP

(57) ABSTRACT

A microwave oven incorporating toaster includes a tray provided on a tray support. The tray support moves forward and backward in inside the toaster. The tray support includes a bushing for moving within moving slots provided at both sidewalls of a toaster case. A connecting lever connects the bushing to a toaster door and translates a motion generated by operation of the toaster door when it opens and closes into a moving motion exhibited by the tray. A food item (e.g., a slice of bread, bagel, etc.) arranged on the tray may be inserted into, or removed from, the inside of the toaster by operating the toaster door.

22 Claims, 5 Drawing Sheets

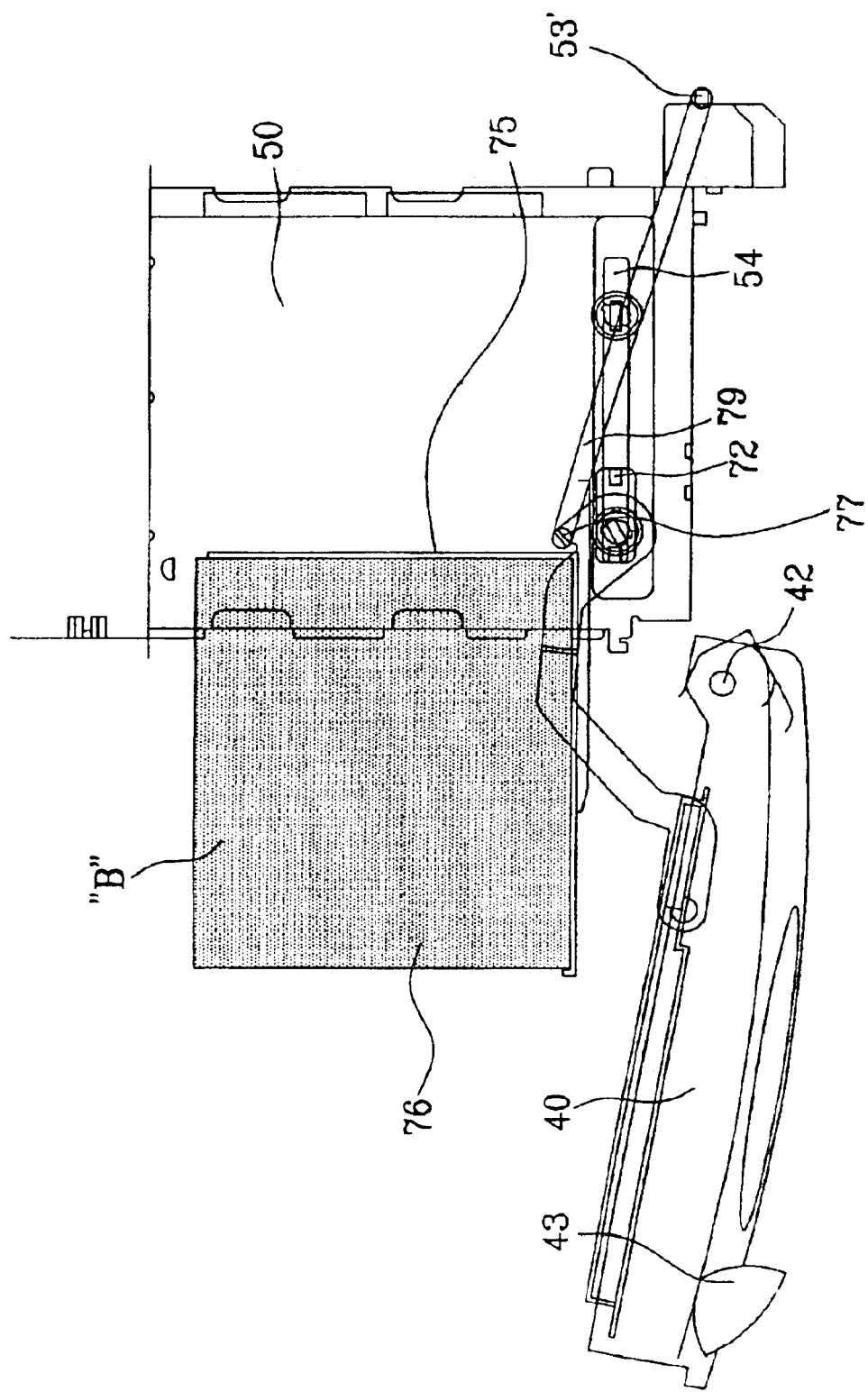

MICROWAVE OVEN WITH BREAD TOASTER

This application claims the benefit of the Korean Application No. 2002-2130 filed on Jan. 14, 2002, which is hereby incorporated by reference for all purposes as if fully set forth herein.

BACKGROUND OF THE INVENTION

1. Field of the Invention

The present invention relates to a microwave oven, and more particularly, to a microwave oven incorporating a toaster.

2. Discussion of the Related Art

Generally, microwave ovens such as those illustrated in FIG. 1, heat objects (e.g., food) by applying microwaves to them. Referring to FIG. 1, microwave ovens include a cavity 2, in which an object may be heated by microwaves. The cavity 2 is formed in an interior of a cavity assembly 1 and may be opened or closed via a cavity door 4. Microwaves may be generated by various electrical devices accommodated with an electrical device chamber 10 provided near the cavity 2. The electrical device chamber may be covered with an outer case 6. The various electrical devices may include, for example, a magnetron 12 for generating microwaves, a high-voltage transformer 14 for supplying high voltage to the magnetron 12, and a fan 16 for generating an air flow inside of the cavity 2 thereby cooling the various electrical devices as they may become heated.

While conventional microwave ovens heat objects using microwaves, microwaves cannot be used to toast food (e.g., bread products). Therefore, microwave ovens capable of toasting food as well as heating an object using microwaves have become desirable. In such microwave ovens including a toaster, each food item (e.g., slice of bread, bagel, etc.) must be positioned proximate a heater within the toaster such that the toasting performance is maximized.

However, after toasting is complete, inner temperatures of the toaster tend to be high, making it difficult to safely draw out the toasted food item from the toaster. For example, drawing out a toasted food item from the toaster using bare hands becomes complicated and dangerous due to the narrow toaster entrance and the high temperature inside the toaster.

Accordingly, the principles of the present invention provide a microwave oven incorporating a toaster that is safe and convenient to use.

SUMMARY OF THE INVENTION

Accordingly, the present invention is directed to a microwave oven incorporating a toaster that substantially obviates one or more problems due to limitations and disadvantages of the related art.

An advantage of the present invention provides a microwave oven incorporating a toaster wherein a food item (e.g., a slice of bread, bagel, etc.) may be easily drawn out from inside of the toaster after being toasted.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a microwave oven incorporating a toaster includes a tray for supporting a food item, an electrical device chamber having various electrical devices for heating food items arranged on the tray, a toaster within the electrical device chamber.

In one aspect of the present invention, the toaster may include a toaster door for opening or closing a toaster entrance and a tray connected to the toaster door by a link mechanism. Accordingly, the tray may be inserted into or removed from the toaster by closing or opening, respectively, the toaster door.

In yet another aspect of the present invention, the link mechanism may include a tray support coupled to an upper portion of the tray, wherein the tray support reciprocates within a toaster case, and a connecting lever for coupling the toaster door to the tray support.

According to the present aspect, the tray support may move along slots arranged within sidewalls at a bottom portion of the toaster case. The slots may be oriented in a direction parallel with the tray. A bushing inserted within the slot and fixed to each of the sides of the tray support may guide the reciprocating movement of the tray support.

Further according to the present aspect, the connecting lever may include a first end rotatably coupled to the bushing and a second end rotatably coupled to the toaster door.

In still another aspect of the present invention, the link mechanism may include an elastic member for connecting the connecting lever to the toaster case. Accordingly, the elastic member may facilitate the closing of the toaster door.

According to the present aspect, the elastic member may connect the first end of the connecting lever to a rear end of the toaster case (e.g., at a portion of a rear case plate).

According to the principles of the present invention, a food item may be easily drawn out from inside of the toaster (e.g., after being toasted) while maintaining safety and convenience in the use of the microwave oven incorporating a toaster.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 5 illustrates a side view of a toaster when a food item out of the toaster.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
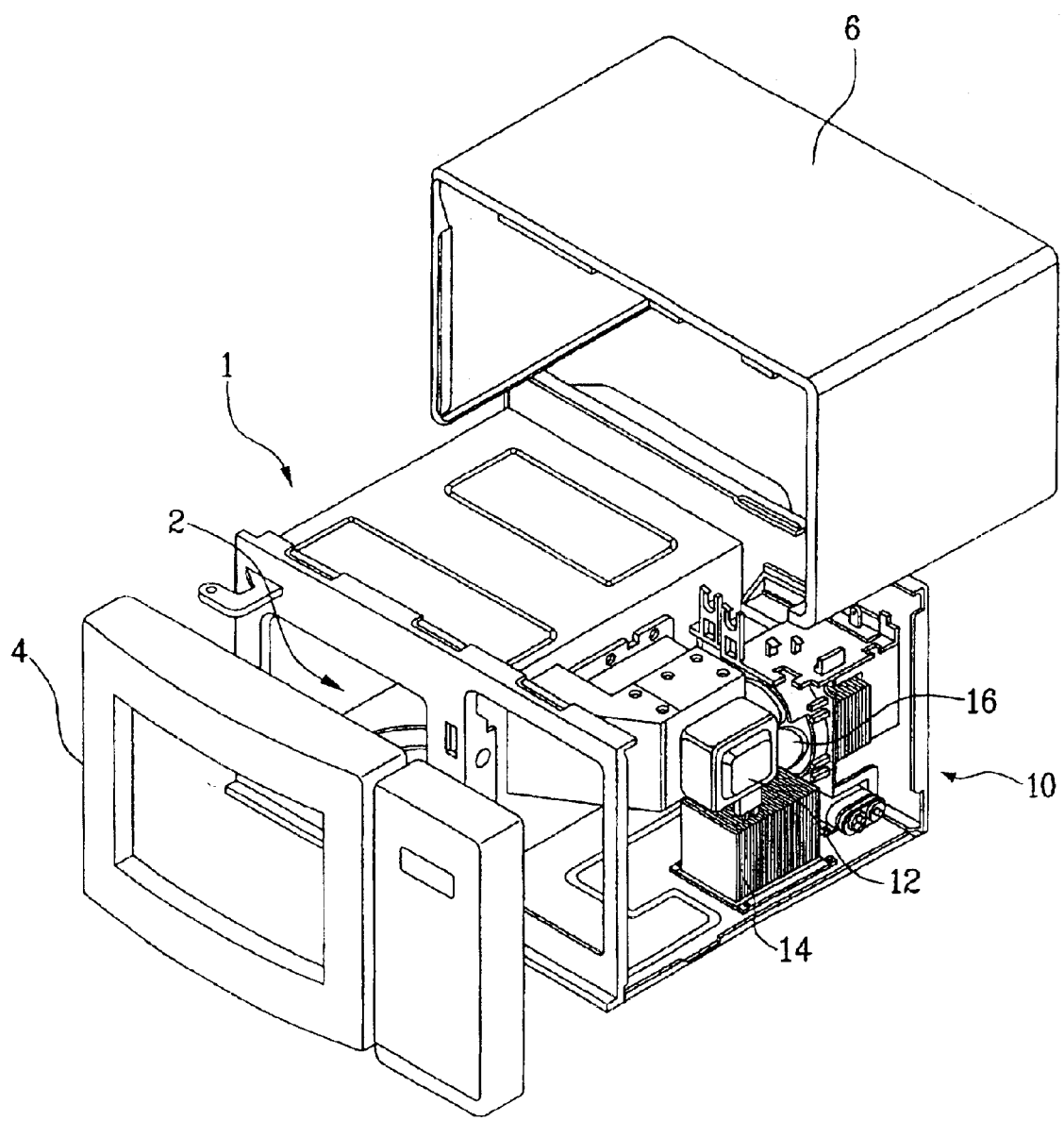
FIG. 1 illustrates an exploded perspective view of a related art microwave oven.
Figure 2:
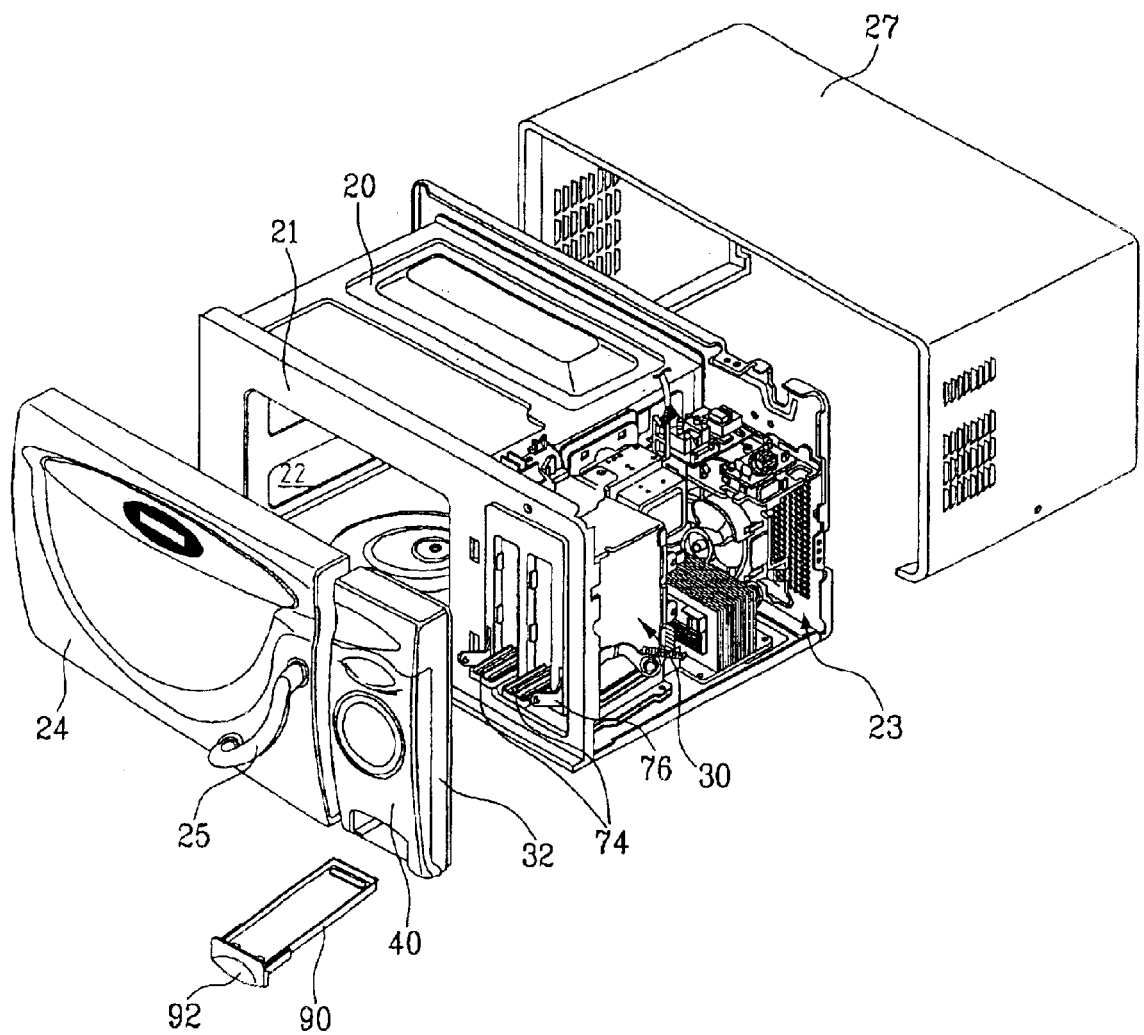
FIG. 2 illustrates a perspective view of a microwave oven incorporating a toaster according to the present invention.

FIG. 2 illustrates an exploded perspective view of a microwave oven incorporating a toaster in accordance with the principles of the present invention.

Referring to FIG. 2, a cavity 22 is arranged within cavity assembly 20 and an electrical device chamber 23 may be arranged adjacent the cavity 22. An object (e.g., food) arranged within the cavity 22 may be heated by microwaves generated by various electrical devices arranged within the electrical device chamber 23.

The cavity 22 may be opened and closed via a cavity door 24. The cavity 22 may be closed when the cavity door 24 contacts a front plate 21. A user may open and close the cavity door 24 using a door handle 25 included within the cavity door 24.

An outer case 27 may cover the cavity assembly 20 and the electrical device chamber 23, thereby forming top and side exterior surfaces of the microwave oven. A toaster 30 may be arranged in front of the electrical devices within the electrical device chamber 23. The toaster 30 may be installed in such a way that it penetrates the front plate 21. A toaster panel 32 comprising an exterior surface material may be provided in front of the toaster 30. In one aspect of the present invention, the exterior surface material of the toaster panel 32 may be the same as that of the cavity door 24, such that a smooth surface may be formed on the front surface of the microwave oven between the toaster panel 32 and the cavity door 24.

Figure 3:
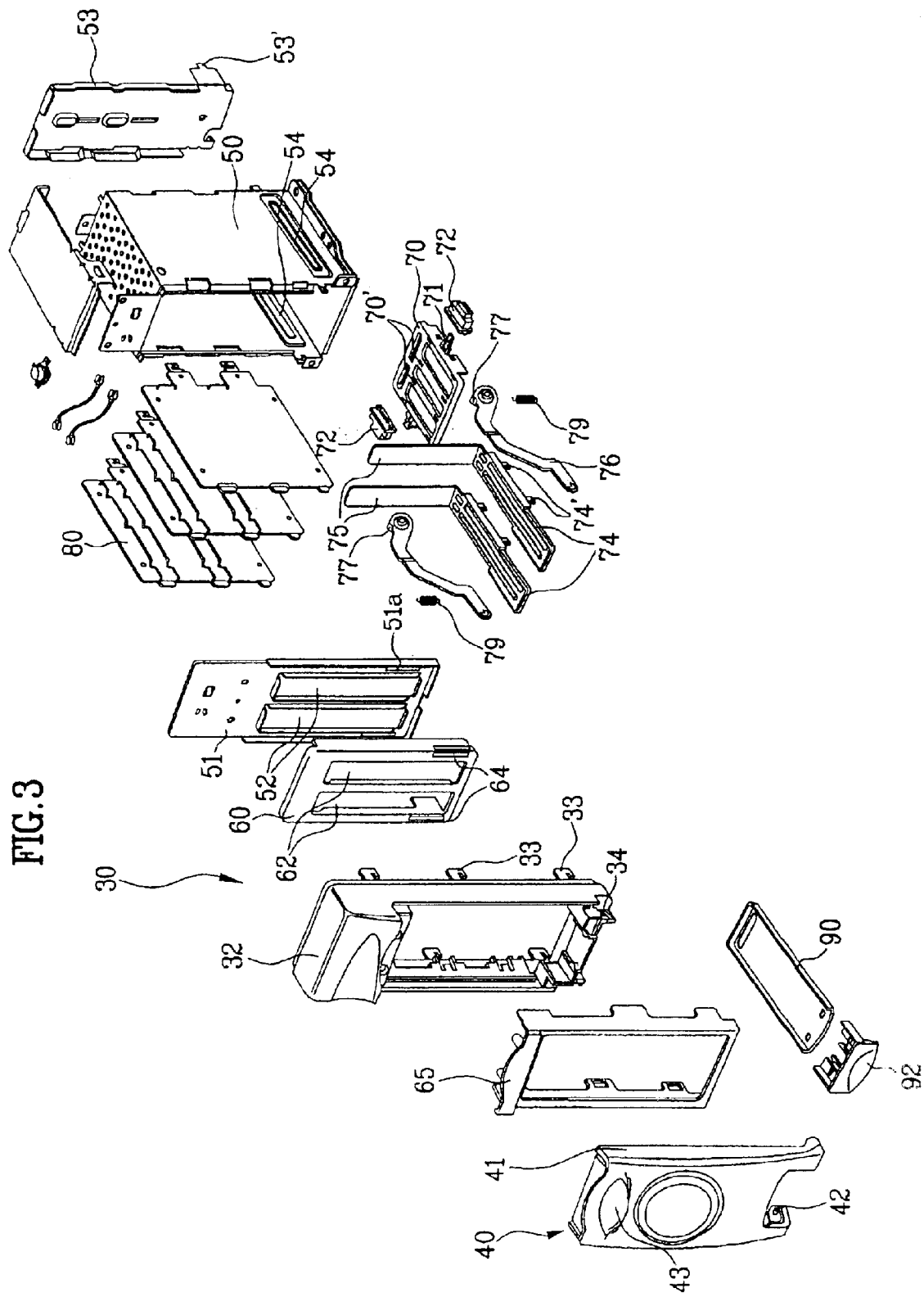
FIG. 3 illustrates an exploded perspective view of the microwave oven incorporating a toaster shown in FIG. 2.

FIG. 3 illustrates an exploded perspective view of the toaster 30 shown in FIG. 2.

Referring to FIG. 3, the rear of the toaster panel 32 may be provided with a plurality of fixing means 33 (e.g., hooks, screws, adhesive material, and the like) such that the toaster panel 32 may be fixed to the front plate 21 (shown in FIG. 2) by the fixing means 33.

The toaster 30 further includes a toaster door 40 attached to the toaster panel 32 by a hinge assembly. To this end, the hinge assembly includes hinge holes 34, included within the toaster panel 32, and hinge pins 42, included within a bottom portion of the toaster door 40. Accordingly, the toaster door 40 may be opened or closed by rotating about an axis formed by the hinge pins 42 and hinge holes 34. In one aspect of the present invention, the exterior surface material of the door panel 41 may be the same as that of the toaster panel 32, such that a smooth surface may be formed on the front surface of the microwave oven between the door panel 41, the cavity door 24 and the toaster panel 32. The hinge pins 42 may be provided at the bottom of the door panel 41 in such a way that the toaster door 40 may rotated into an opened and closed position. The door panel 41 further includes a toaster door handle 43 allowing a user to open and close the toaster door 40.

Referring to still to FIG. 3, the toaster 30 further includes a toaster case 50 arranged at the back portion of the toaster panel 32. The toaster case 50 may be coupled to the toaster panel 32 through a portion of the front plate 21 corresponding to the front side of the electrical device chamber 23. In one aspect of the present invention, the toaster case 50 may be made of metal material, provide a space for toasting each food item, and include a case front plate 51.

The case front plate 51 provided at the front of the toaster case 50 includes two case entrances 52 through which food items may pass upon their insertion into and removal from the interior of the toaster case 50. Two spring hooks 53' may be provided at the bottom of a rear case plate 53 provided at the back of the toaster case 50. Each of the spring hooks 53' may be connected to one end of an elastic member 79 for purposes that will be discussed in greater detail below.

A toaster front 60 made of metal material may be arranged at the front of the case front plate 51 and within the toaster panel 32. The toaster front 60 includes two rectangular toaster entrances 62 that may be selectively exposed or concealed when the toaster door 40 or closed, respectively. Each of the toaster entrances 62 may be coupled to respective ones of the case entrances 52.

The toaster 30 further includes a plurality of heaters 80 formed within the toaster case 50. The heaters 80 are capable of generating heat sufficient to toast a food item (e.g., slice of bread, etc.). Each of the heaters comprise a plurality of heating elements (e.g., heat-generating wires wound about a support plate, not shown). The heaters may be positioned at portions corresponding to sides of food items and provide heat to the both sides food items arranged within the toaster 30.

A door protector 65 made out of thermally insulating material may be arranged between the toaster front 60 and the toaster panel 32. Accordingly, the door protector 65 may be provided to block heat generated within the toaster from flowing from the toaster front 60 to the toaster panel 32.

A crumb holder 90 may be arranged at the bottom of the toaster case 50 through the lower part of the toaster panel 32. The front of the crumb holder 90 comprises a holder handle 92 provided between the hinge pins 42. In practice, a user may pull the holder handle 92 to draw out the crumb holder 90, empty the crumb holder 90, and push the holder handle 92 back thereby placing the crumb holder 90 at the bottom of the toaster case 50. In one aspect of the present invention, holder handle 92 may include a surface material that is the same as that of the door panel 41.

The toaster 30 may include at least one tray 74 positioned within the toaster case 50. The tray supports the food item, for example, while the food item is heated. In one aspect of the present invention, the tray 74 may support a food item arranged vertically thereon (i.e., an orientation wherein a major surface of the food item is arranged vertically over the tray 74). While FIG. 3 illustrates two trays 74, a plurality of trays may be provided as required.

In one aspect of the present invention, tray 74 may be inserted into, and removed from, the interior of the toaster 30. Accordingly, a food item arranged on the tray 74 may be inserted and removed from the toaster 30. In one aspect of the present invention, tray 74 may be moved by manipulating the toaster door 40. For example, a link mechanism may be provided so as to couple to the toaster door 40 to the tray 74.

Accordingly, the link mechanism may include a connecting lever 76 connecting the toaster door 40 to a tray support 70. The tray support 70 may be reciprocally moveable within the toaster case 50.

Still referring to FIG. 3, a plurality of fastening slits 70' may be arranged within a flat area of the tray support 70 and a plurality of fastening hooks 74' may be provided at the bottom of the tray 74. The fastening slits 70' accommodate respective ones of the plurality of fastening hooks 74' such that the tray 74 may be securely arranged on the tray support 70. In one aspect of the present invention, when the tray 74 is securely arranged on the tray support 70, the tray 74 may be moved as the tray support 70 moves.

Additionally, a support flange 75 may be provided at the rear end of the tray 74 for supporting a food item.

Accordingly, the food item may be stably positioned on the tray 74 by the support flange 75 when the toaster door 40 is opened or closed. For example, the support flange may support a backside of the food item when the tray 74 moves out of the toaster 30. Accordingly, so that the food item may be stably positioned on the tray 74 and prevented from falling down.

In one aspect of the present invention, the tray support 70 stably moves along directions dictated by a pair of moving slots 54 provided within sidewalls of the toaster case 50 and oriented along a direction parallel to the bottom edge of the toaster case sidewalls. The tray support 70 may include two connecting parts 71 provided on left and right sides of the tray support 70. Bushing 72 may be provided at ends of each connecting parts 71 and inserted into a respective one of a moving slots 54. In one aspect of the present invention, each bushing 72 supports the tray support 70 and has a shape allowing it to move within the moving slot 54 while preventing the tray support 70 from rotating while the bushing 72 is moving. For example, a portion of bushing 72 that is to be inserted into the moving slot 54 has a hexahedron-shape. By preventing the tray support 70 from rotating, the trays 74 may always be kept parallel to the orientation of the moving slots 54.

In one aspect of the present invention, the tray support 70 may be the same width as a frontal width of the toaster case 50. Accordingly, when the tray support 70 moves forward, toward the case front plate 51, the tray support 70 may be locked to a lower portion of a case front plate 51 such that the tray support 70 does not project out from the case front plate 51. When the toaster door 40 is completely opened, however, a predetermined portion of each tray 74 may be projected out from each toaster entrances 52 and 62.

Lever slots 64 and 51a may be formed at bottom portions of toaster front 60 and case front plate 51, respectively. A first end of the connecting lever 76 may rotatably coupled to the bushing 72, and a second end of the connecting lever 76 may be rotatably coupled to the toaster door 40. Therefore, the connecting lever 76 may mechanically couple bushings 72 to the toaster door 40 by moving within lever slots 64 and 51a. By coupling the tray support to the toaster door 40 via the connecting lever 76, the tray support 70 may be moved in by rotating the toaster door 40 about the axis formed by the hinge pins 42.

In one aspect of the present invention, the link mechanism further includes an elastic member 79, (e.g., spring, elastic material, etc.) between the connecting lever 76 and the toaster case 50. The elastic member 79 couples the first end of the connecting lever 76 to a rear end of the toaster case 50.

Figure 4:
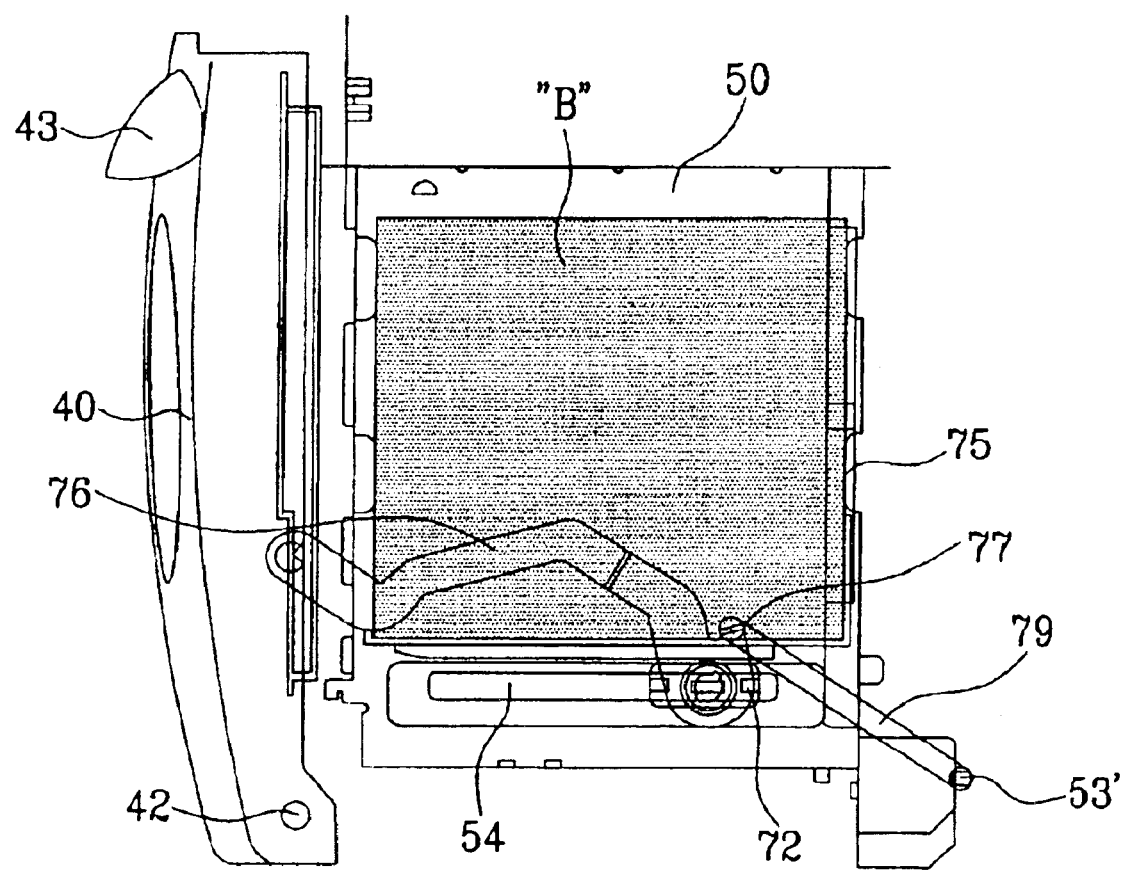
FIG. 4 illustrates a side view of a toaster when a food item is within the toaster.

Referring to FIGS. 4 and 5, a first end of the elastic member 79 is connected to the first end of the connecting lever 76 and a second end of the elastic member 79 is connected to the rear end of the toaster case 50. For example, the first end of the elastic member 79 may be coupled to spring hook 77 formed at the first end of the connecting lever 76, while the second end of the elastic member 79 may be coupled to a spring hook 53' formed at the rear of the rear case plate 53.

Accordingly, when the toaster door 40 is opened, the elastic member 79 may be extended between the spring hooks 77 and 53'. When the toaster door 40 is closed, the elastic member 79 exerts a restoring force on the first end of the connecting lever 76 such that the toaster door 40 becomes closed.

Whenever the toaster door 40 is opened or closed via the aforementioned link mechanism, the tray 74 is either inserted into or removed from the toaster case 50. Accordingly, whenever toaster entrances 62 and 52 become opened or closed, the a food item arranged on the tray 74 is either inserted into or removed from the toaster case 50.

The operation of the microwave oven incorporating a toaster according to the present invention will now be described in detail.

Referring to FIG. 4, for the sake of explanation only, it will be assumed that the entrances 52 and 62 are closed by the toaster door 40 provided at the front of the toaster panel 32.

If the user pulls the door handle 43 (e.g., after toasting of the food item is complete) and opens the toaster door 40, the toaster door rotates about an axis formed by the hinge pins 42 and hinge holes 34 and is thus opened as shown in FIG. 5. At the same time, the connecting lever 76 is pulled by the toaster door 40, overcomes a restoring force provided by the elastic member 79, becomes projected out through the lever slots 51a and 64, and moves the bushing 72 along and within the moving slot 54 such that the bushing 72 moves the tray support 70 in a direction toward the front end of the toaster case 50.

Subsequently, one portion of the tray 74, secured to the tray support 70, projects out from the entrance 62 at a predetermined distance. Accordingly, a food item, B, arranged on the tray 74 is removed from the toaster case 50 due to the rotation of the toaster door 40 and a user may easily remove out the food item, B, without being burned.

Still referring to FIGS. 4 and 5, the support flange 75 supports the backside of the food item, B. In one aspect of the present invention, the support flange 75 may be pulled on to push a food item out from inside the toaster case 50 if the food item were to get stuck at the case entrance 52 of the case front plate 51. For example, food item B may get stuck at the case entrance 52 if, for example, it were to lean slightly on the tray 74.

According to the principles of the present invention, the tray of the toaster may be automatically inserted into or removed from the toaster case upon opening or closing the toaster door. Additionally, the rear flange of the tray may support the backside of a food item to be toasted and may be pulled on to push out a food item that becomes stuck within the toaster. Accordingly, the microwave oven incorporating a toaster of the present invention facilitates the ease with which a food item may be removed from a toaster case, thereby improving the safety and ease of use of the product.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A microwave oven incorporating a toaster, comprising:
   a microwave cavity;
   a toaster arranged adjacent said microwave cavity and including at least one opening;
   a toaster door for selectively exposing or concealing said at least one opening;
   at least one tray included within the toaster; and
   a link mechanism comprising:
     a tray support for supporting said at least one tray; and
     a connecting lever, wherein said tray support and said toaster door are coupled to each other via said connecting lever, wherein said at least one tray is arranged within said toaster when said at least one opening is concealed, and wherein a portion of said at least one tray projects from said toaster through said at least one opening when said at least one opening is exposed.

2. The microwave oven incorporating a toaster as claimed in claim 1, further comprising at least one moving slot arranged within said toaster, wherein said tray support is moveable along said at least one moving slot.

3. The microwave oven incorporating a toaster as claimed in claim 2 wherein said at least one moving slot is arranged within a bottom portion of said toaster.

4. The microwave oven incorporating a toaster as claimed in claim 2, wherein said at least one moving slot is oriented parallel to said at least one tray.

5. The microwave oven incorporating a toaster as claimed in claim 2, further comprising a bushing coupled to said tray support, said bushing being moveable within said at least one moving slot.

6. The microwave oven incorporating a toaster as claimed in claim 5, wherein said connecting lever comprises a first end and a second end, wherein said bushing is rotatably coupled to said first end, and wherein said toaster door is rotatably coupled to said second end.

7. The microwave oven incorporating a toaster as claimed in claim 6, further comprising an elastic member coupled to said connecting lever, said elastic member exerting a force on said connecting lever away from said toaster door.

8. The microwave oven incorporating a toaster as claimed in claim 7, further comprising an elastic member coupled to said first end of said connecting lever.

9. The microwave oven incorporating a toaster as claimed in claim 1, wherein said toaster door is rotatably coupled to said toaster.

10. The microwave oven incorporating a toaster as claimed in claim 9, further comprising an axis arranged at a bottom portion of said toaster door.

11. The microwave oven incorporating a toaster as claimed in claim 1, further comprising a flange provided at a rear of said at least one tray.

12. A microwave oven incorporating a toaster, comprising:
    a microwave cavity;
    a toaster arranged adjacent said microwave cavity;
    a toaster case included within said toaster;
    a toaster front arranged at a front portion of said toaster case, said toaster front including at least one first opening and at least one second opening;
    a toaster door for selectively exposing or concealing said at least one first opening a lever provided within said at least one second opening;
    at least one tray; and
    a tray support supporting said at least one tray and coupled to said lever, wherein said at least one tray is coupled to said toaster door via said lever and said tray support, wherein at least a portion of said at least one tray is arranged within said toaster case via said at least one first opening.

13. The microwave oven incorporating a toaster according to claim 12, wherein said at least one tray is arranged within said toaster case when said at least one first opening is concealed, and wherein, via said at least one second opening, a portion of said at least one tray projects from said toaster case through said at least one first entrance when said at least one first entrance is exposed.

14. The microwave oven incorporating a toaster according to claim 12, further comprising at least one moving slot arranged within said toaster case, wherein said tray is moveable along an orientation of said at least one moving slot.

15. The microwave oven incorporating a toaster according to claim 14, further comprising, a case front plate arranged between said toaster case and said toaster front, said case front plate comprising at least one third opening and at least one fourth opening, wherein said at least one third opening corresponds with said at least one first opening and said at least one fourth opening corresponds with said at least one second opening.

16. The microwave oven incorporating a toaster according to claim 15, wherein said case front plate restricts the movement of said tray support in a direction along said orientation of said at least one moving slot.

17. The microwave oven incorporating a toaster according to claim 14, wherein said at least one moving slot is arranged within a bottom portion of said toaster case.

18. The microwave oven incorporating a toaster according to claim 14, wherein said at least one moving slot is oriented parallel to said at least one tray.

19. The microwave oven incorporating a toaster according to claim 14, further comprising a bushing coupled to said tray support, said bushing being moveable within said at least one moving slot.

20. The microwave oven incorporating a toaster according to claim 19, wherein said lever comprises a first end and a second end, wherein said bushing is rotatably coupled to said first end, and wherein said toaster door is rotatably coupled to said second end.

21. The microwave oven incorporating a toaster according to claim 12, further comprising a rear case plate arranged at a rear portion of said toaster case.

22. The microwave oven incorporating a toaster as claimed in claim 21, further comprising an elastic member, said elastic member elastically coupling said lever to said rear case plate.

* * * * *